Nov. 1, 1949   M. H. CRAMER   2,486,735
AUTOMOBILE BODY AND ENGINE HEATER
Filed Aug. 5, 1947   2 Sheets-Sheet 1

INVENTOR.
MARVIN H. CRAMER,
BY
McMorrow, Berman + Davidson
ATTORNEYS.

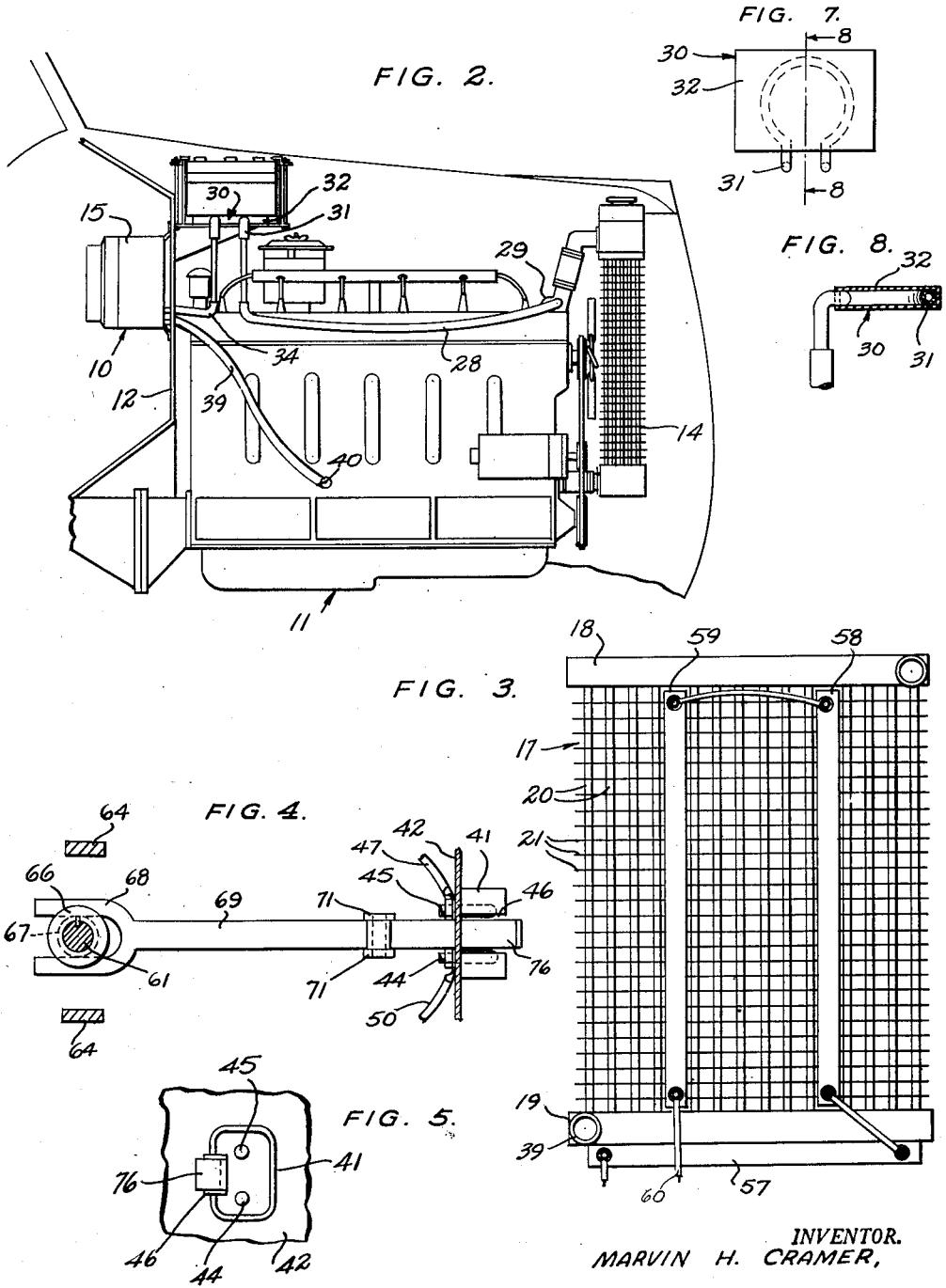

Patented Nov. 1, 1949

2,486,735

UNITED STATES PATENT OFFICE 2,486,735

AUTOMOBILE BODY AND ENGINE HEATER

Marvin H. Cramer, George, Iowa

Application August 5, 1947, Serial No. 766,236

4 Claims. (Cl. 237—1)

This invention relates to an automobile heater which may be used selectively for heating the interior of the vehicle under normal engine-operating conditions and which may be operated in reverse for heating the engine for starting in abnormally cold weather.

It is an object of this invention to provide an automobile or vehicle heater of the kind to be more particularly described hereinafter, which may be operated by the engine water-cooling system and automobile battery for warming the interior of the vehicle when the engine is operating normally, and which may be operated in a substantially reverse direction from an external source of electric supply for heating the engine in extremely cold weather until the temperature has been raised to a predetermined value, at which time the heater will be disposed for normal heating operation.

Another object of this invention is to provide a heater of this kind having a pump driven by the fan motor for circulating the water throughout the engine-cooling system when the heater is being operated as an engine pre-heater.

Another object of this invention is to provide a heater of this kind having a clutch between the fan motor and the pump operated by insertion of the plug from the source of external electric supply, so that the pump will not be operated when the heater is connected to the automobile ignition or electrical system.

A further object of this invention is to provide a temperature-responsive safety switch in the circuit of the external source of electric supply responsive to the temperature of the fluid in the engine-cooling system. The safety switch is adapted to be closed only at a low temperature when it is desired to heat the engine and will be opened to external circuit-breaking position when the temperature is above a certain value so the external circuit will not be left inadvertently connected to the heater.

A still further object of this invention is to provide a heater for the battery in connection with the engine and body heater system to raise the temperature of the battery for easy starting and operation in abnormally cold weather.

With the above and other objects in view, which may hereinafter more fully appear, my invention consists of the arrangement, combination, and details of construction disclosed in the drawings and description, but it is understood that changes, variations and modifications may be resorted to which fall within the scope of my invention as pointed out in the appended claims.

In the drawings:

Figure 2 is a side elevation of the heater as mounted on the engine in a vehicle, the vehicle being shown diagrammatically.

Figure 3 is a rear elevation of the heater radiator removed from the heater, with the heating elements attached.

Figure 4 is a fragmentary section, partly broken away, taken on the line 4—4 of Figure 1.

Figure 5 is a side elevation of the external circuit plug connection shown in Figure 4.

Figure 7 is a top plan view of the battery heater removed from the assembly.

Figure 8 is a transverse section taken on the line 8—8 of Figure 7.

Figure 1:
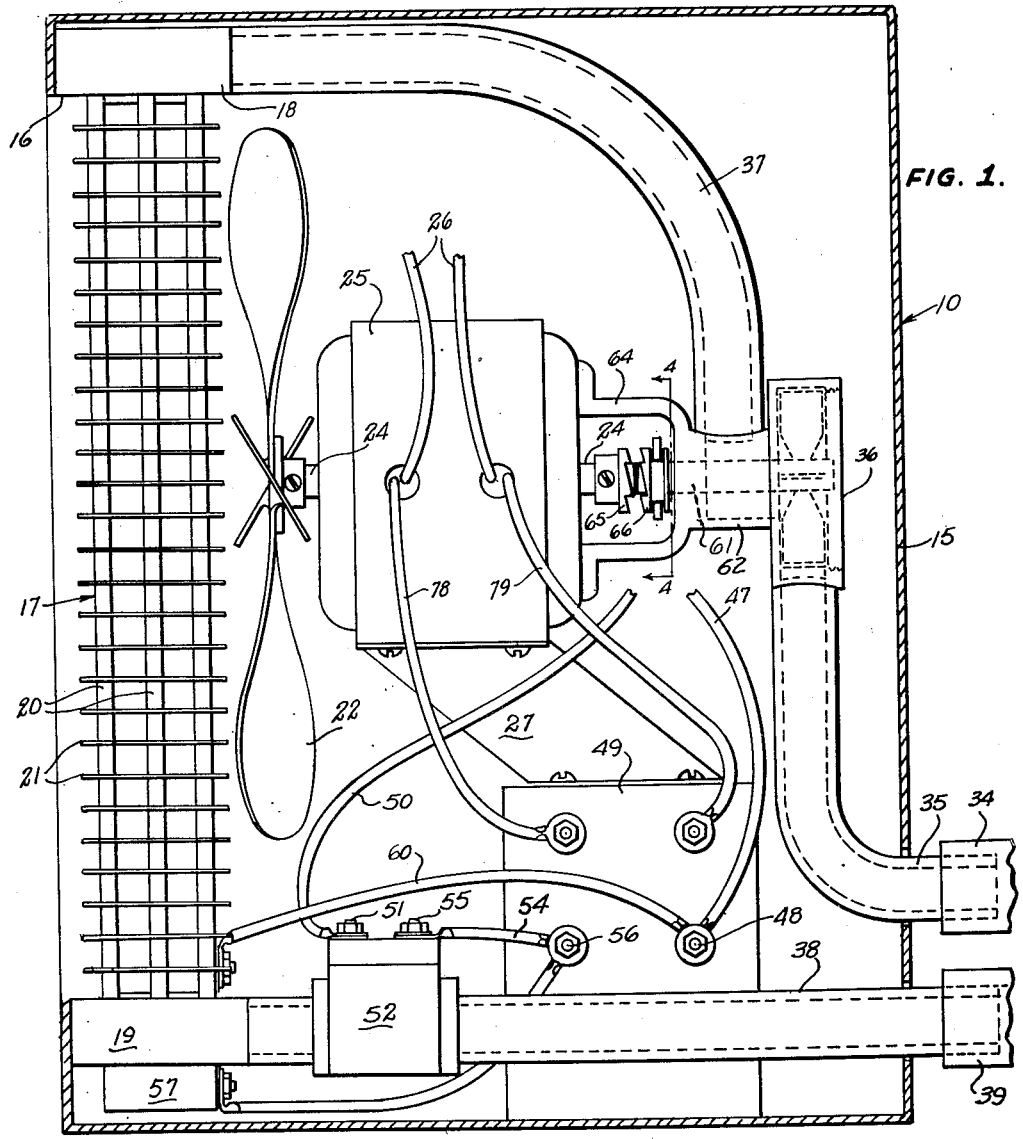
Figure 1 is a longitudinal section, partly broken away, of a heater constructed according to an embodiment of my invention.
Figure 6:
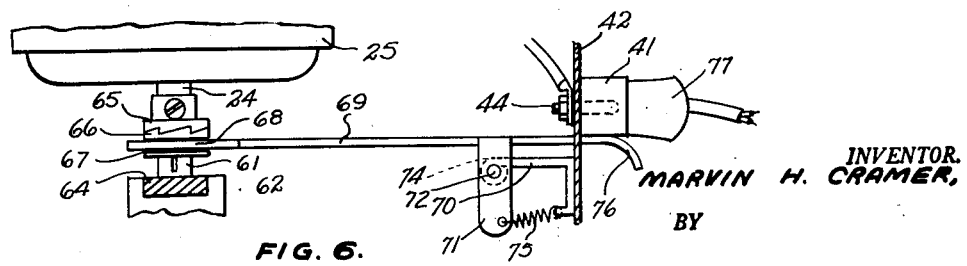
Figure 6 is a fragmentary top plan view, partly broken away and partly in section, of the pump clutch and operator.

Referring to the drawings, the numeral 10 designates generally a heater for connection to the water-cooling system of an engine 11. The heater 10 is so constructed and arranged that it may be used as a conventional type of automobile heater when the engine is running normally. As in conventional types of heaters of this kind the heater 10 is constructed to utilize the water or other fluid of the engine-cooling system as the heat conducting medium. As an improvement over the conventional types of automobile heaters, the heater 10 may be utilized for heating the engine and battery under abnormally cold conditions prior to starting the engine. The heater 10 is adapted to be mounted in the body or cab of the vehicle on the opposite side of the engine wall 12 from the engine.

The engine 11 may be of any conventional type having a liquid-cooling system embodying an engine-driven pump, not shown, and a correlated engine radiator 14.

The heater 10 is formed with a housing 15 open at one end, as at 16. The housing 15 is adapted to be secured to the engine wall 12 with the open end 16 facing into the body or cab of the vehicle. A heater radiator 17 is fixed in the open end of the housing 15. The heater 17 is formed with an upper reservoir 18 and a lower sump 19 connected together by vertical tubes 20 through which the liquid may flow. Heating vanes 21 are secured to the tubes 20 for conducting the heat therefrom.

A fan 22 is mounted in the housing 15 behind the radiator 17 for forcing air over the vanes 21 and tubes 20 for heating the air in the vehicle. The fan 22 is connected to a shaft 24 of an electric motor 25 in the housing. The motor 25 is connected by suitable circuit-connecting means or leads 26 to the battery of the vehicle. A bracket 27 is provided in the housing for supporting the engine 25 and fan 22.

A flexible tube 28 is connected at one end to the upper end of the engine-cooling system between the engine and upper end of the radiator 14 below the engine thermostat, as indicated at 29. The tube 28 is provided for admitting the fluid from the engine to the heater 10 when the heater is operated as a body heater, and for conducting the water from the heater to the engine when the heater is being operated as an engine pre-heater.

A battery heater 30 is provided between the engine and heater and is connected to the other end of the tube 28. The battery heater 30 is formed of a coil or loop of tubing 31 fixed to the base 32 of the battery support in the engine compartment. An outlet tube 34 is connected to the inlet connection 35 of the heater 10 and the tube 28 connects the inlet side of the tube 31 to the engine-cooling system.

The terms "inlet" and "outlet" as referring to the tubes refer to the normal operation of the heater 10 as a body or cab heater.

The inlet connection 35 is connected at its upper end to one side of a pump 36 in the heater housing 15. The other side of the pump 36 is connected by an inlet tube 37 to the upper reservoir 18. A lower or outlet connecting tube 38 extends from the lower sump 19 out of the housing 15 and is connected by a flexible tube 39 which is the return line to the lower end of the engine-cooling system and is connected to the engine 11, as at 40, and then to the engine pump.

In the use and operation of the heater 10 as a body heater, the water is conducted through the tube 28, the battery heater 30, the heater 10 and back to the engine through the conduit 39. The motor connected to the battery drives the fan for passing air through the radiator 17 into the body of the vehicle.

The heater 10 may also be used as an engine preheater connected to an external source of electric supply for actuating a heater and the motor 25 when the engine is too cold to be operated and the battery is too cold for efficient operation.

For connecting the heater to an external source of electric supply, as a conventional house circuit of 110 volts, direct current, a socket 41 is fixed on one side wall, as at 42, of the housing 15. A pair of terminals 44 and 45 extend through the wall 42 within the socket 41. One side wall of the socket 41 is formed with an opening or enlarged slot 46 within which a clutch lever, to be described hereinafter, is adapted to engage. One lead 47 is connected at one end to the terminal 45 and at the other end to a terminal 48 on a transformer 49 in the housing 15. The transformer is provided for reducing the commercial supply circuit to the same voltage as that furnished by the engine battery.

One end of a wire or lead 50 is connected to the terminal 44 of the socket 41 and the other end is connected to a terminal 51 on a temperature-responsive switch 52. A lead 54 connects between the other terminal 55 on the switch 52 and the other terminal 56 on the transformer 49.

The temperature-responsive switch 52 is connected in the conduit 38 between the heater 10 and engine 11 as a safety switch to prevent the use of external power when the engine is sufficiently warm. The safety switch 52 is normally open when the water is above 60° F. The switch 52 is constructed and arranged to open when the temperature reaches 60° F. and closes when the temperature of the water is below 40° F.

Electrical heat elements 57, 58, and 59 are fixed to or carried by the radiator 17 for heating the water therein when the heater 17 is being used as an engine pre-heater. The heat elements 57, 58, and 59 are of a conventional resistance-type heat units.

One terminal on one of the resistors, as 57, is connected to one terminal of the transformer 49, as at 56. Wires or other suitable conducting means are provided for connecting the resistors in series, as shown in Figure 3. A wire or lead 60 connects another resistor, as 59, to the other terminal 48 of the transformer for completing the external circuit through the heater.

When the temperature of the entine-cooling system falls below 40° and the external power is connected to the heater, heat is applied to the resistors and to the radiator 17 for circulation through the engine 11 and battery support 30.

The pump 36 is provided for circulating the water through the engine 11 and heater 10 when the heater is connected to the external power. The pump 36 is disposed between the tubes 35 and 37 of the inlet to the heater. The pump shaft 61 is rotatably journaled in a bearing 62 supported on a bracket 64 on the rear of the motor 25. A clutch element 65 is fixed on the rear end of the motor 25 and a correlated clutch member 66 is slidably mounted on the pump shaft 61. The clutch plate 66 is keyed on the shaft 61 to provide for rotation of the plate 66 and shaft 61, while the plate 66 is slidable along the end of the shaft for selective engagement with the plate 65 on the motor 25.

The clutch member 66 is provided with an annular groove 67 in which the forked end 68 of a bifurcated arm or clutch operator 69 is engaged for sliding the plate 66 into and out of engagement with the plate 65. The operator or arm 69 is pivotally or rockably mounted on the side wall 42 immediately adjacent the external power socket 41. A bracket 70 is fixed on the inner surface of the wall 42 and the arm 69, having outwardly-extending ears 71 is pivotally connected thereto by a pintle or hinge pin 72 engaging through the ears 71 and hinge barrel 74 on the bracket 70. A spring 75 engages between an extension of the ears 71 beyond the hinge point 74 and the bracket 70 for biasing the forked end 68 rearwardly and the plate 66 to the disengaged position relative to the plate 65. The outer end of the arm 69 extends through the wall 42 and normally extends with the socket 41 in the opening 46. The terminal end of the arm 69 is bent outwardly, as at 76, to provide a sliding guide engageable with the plug 77 of an external wire connection. As the plug 77 is pushed into engagement with the terminals 44 and 45 of the socket 41, the plug 77 will engage the guide 76 for rocking the clutch operator 69 into clutch-engaging position.

The motor 25 is connected to the transformer 49 by wires 78 and 79 for operating the motor from the external power.

In the use of the heater 10 as an engine preheater, the engagement of plug 77 in the socket 41 will engage the clutch members 65 and 66 by way of the bifurcated pivotal arm 69. When the temperature is below 40° F., the external circuit will be closed through the safety thermal switch 52 to the resistor elements 57, 58, and 59, and to the electric motor 25. The rotation of the electric motor 25 will operate the pump 36 for forcing the water out of the heater 10 through tubes 35, 34, the battery heater 30, tube 28, the engine 11, tubes 39, 38, the radiator 17, and back through tube 37. The direction of flow of the heater water to the engine 11 is reverse from the normal flow of the water under normal engine operation.

Having thus described my invention, what I claim is:

1. A heater for raising the temperature of the cooling system of the engine of a motor vehicle, said heater comprising a heating unit mounted in said vehicle and having a radiator and an electric motor driven fan positioned relative to said radiator, said motor driven fan having a rotary shaft, coolant circulating pump having a shaft aligned with the fan shaft, conduit means connecting said radiator with the engine cooling system having said pump incorporated therein for reversing the normal direction of circulation of coolant in said system, normally disengaged clutch means operatively associated with the fan and pump shafts having a pivoted clutch lever, electrical heating means associated with said radiator for heating coolant therein prior to and during reverse circulation of the coolant in the engine cooling system, a current supply for operating said electrical heating means and said motor driven fan having a connector plug, a connector into which said current supply plug is adapted to be inserted for operating said electrical heating means and said motor driven fan, and a portion on said clutch lever engageable by said plug as said plug is inserted in said connector whereby said clutch means is engaged whereby said pump is driven simultaneously with the energization of said electrical heating means.

2. A heater for raising the temperature of the cooling system of the engine of a motor vehicle, said heater comprising a heating unit mounted in said vehicle and having a radiator and an electric motor driven fan positioned relative to said radiator, said motor driven fan having a rotary shaft, coolant circulating pump having a shaft aligned with the fan shaft, conduit means connecting said radiator with the engine cooling system having said pump incorporated therein for reversing the normal direction of circulation of coolant in said system, normally disengaged clutch means operatively associated with the fan and pump shafts having a pivoted clutch lever, electrical heating means associated with said radiator for heating coolant therein prior to and during reverse circulation of the coolant in the engine cooling system, a current supply for operating said electrical heating means and said motor driven fan having a connector plug, a connector into which said current supply plug is adapted to be inserted for operating said electrical heating means and said motor driven fan, and a portion on said clutch lever engageable by said plug as said plug is inserted in said connector whereby said clutch means is engaged whereby said pump is driven simultaneously with the energization of said electrical heating means, and a temperature responsive switch exposed to the temperature of the coolant in said conduit means and connected in circuit between said connector and said electrical heating means and electric motor driven fan, whereby said electrical heating means and electric motor driven fan are deenergized when the temperature of the coolant in said conduit means rises above a predetermined level.

3. A heater for raising the temperature of the cooling system of the engine of a motor vehicle, said heater comprising a heating unit mounted in said vehicle and having a radiator and an electric motor driven fan positioned relative to said radiator, said motor driven fan having a rotary shaft, coolant circulating pump having a shaft aligned with the fan shaft, conduit means connecting said radiator with the engine cooling system having said pump incorporated therein for reversing the normal direction of circulation of coolant in said system, normally disengaged clutch means operatively associated with the fan and pump shafts having a pivoted clutch lever, electrical heating means associated with said radiator for heating coolant therein prior to and during reverse circulation of the coolant in the engine cooling system, a current supply for operating said electrical heating means and said motor driven fan having a connector plug, a connector into which said current supply plug is adapted to be inserted for operating said electrical heating means and said motor driven fan, and a portion on said clutch lever engageable by said plug as said plug is inserted in said connector whereby said clutch means is engaged whereby said pump is driven simultaneously with the energization of said electrical heating means, said fan being positioned relative to said radiator to drive air tempered by passage through said radiator toward a portion of said motor vehicle other than said engine and its cooling system.

4. A heater for raising the temperature of the cooling system of the engine of a motor vehicle, said heater comprising a heating unit mounted in said vehicle and having a radiator and an electric motor driven fan positioned relative to said radiator, said motor driven fan having a rotary shaft, coolant circulating pump having a shaft aligned with the fan shaft, conduit means connecting said radiator with the engine cooling system having said pump incorporated therein for reversing the normal direction of circulation of coolant in said system, normally disengaged clutch means operatively associated with the fan and pump shafts having a pivoted clutch lever, electrical heating means associated with said radiator for heating coolant therein prior to and during reverse circulation of the coolant in the engine cooling system, a current supply for operating said electrical heating means and said motor driven fan having a connector plug, a connector into which said current supply plug is adapted to be inserted for operating said electrical heating means and said motor driven fan, and a portion on said clutch lever engageable by said plug as said plug is inserted in said connector whereby said clutch means is engaged whereby said pump is driven simultaneously with the energization of said electrical heating means, said engine having a battery and said conduit means having a loop in heat exchange relation to said battery for raising the temperature of the battery along with that of the cooling system.

MARVIN H. CRAMER.

REFERENCES CITED

The following references are of record in the file of this patent:

UNITED STATES PATENTS

| Number | Name | Date |
| --- | --- | --- |
| 2,019,991 | Nilson | Nov. 5, 1935 |
| 2,201,916 | Parsons | May 21, 1940 |
| 2,230,051 | Conklin | Jan. 28, 1941 |
| 2,405,143 | Holthouse | Aug. 6, 1946 |